May 17, 1955 KARL-HANS NEU ET AL 2,708,290

DOUBLE BELT DRAWING MECHANISM

Filed Nov. 29, 1952 9 Sheets-Sheet 1

INVENTORS
KARL-HANS NEU
ERNST ROGNER
BY Michael S. Striker
Agt

May 17, 1955 KARL-HANS NEU ET AL 2,708,290

DOUBLE BELT DRAWING MECHANISM

Filed Nov. 29, 1952 9 Sheets-Sheet 2

INVENTORS
KARL-HANS NEU
ERNST ROGNER
BY Michael S. Striker
Agt

INVENTORS
KARL-HANS NEU
ERNST ROGNER
BY Michael S. Striker
Agt.

May 17, 1955 KARL-HANS NEU ET AL 2,708,290

DOUBLE BELT DRAWING MECHANISM

Filed Nov. 29, 1952 9 Sheets-Sheet 4

INVENTORS
KARL-HANS NEU
ERNST ROGNER

BY Michael S. Striker
Agt.

May 17, 1955 KARL-HANS NEU ET AL 2,708,290

DOUBLE BELT DRAWING MECHANISM

Filed Nov. 29, 1952 9 Sheets-Sheet 5

INVENTORS
KARL-HANS NEU
ERNST ROGNER

BY Michael S. Striker
Agt.

DOUBLE BELT DRAWING MECHANISM

Filed Nov. 29, 1952

INVENTORS
KARL-HANS NEU
ERNST ROGNER
BY Michael S. Striker
—Agt.

FIG. 12
FIG. 13
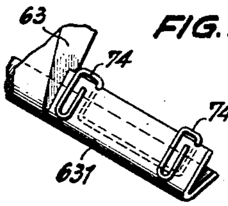
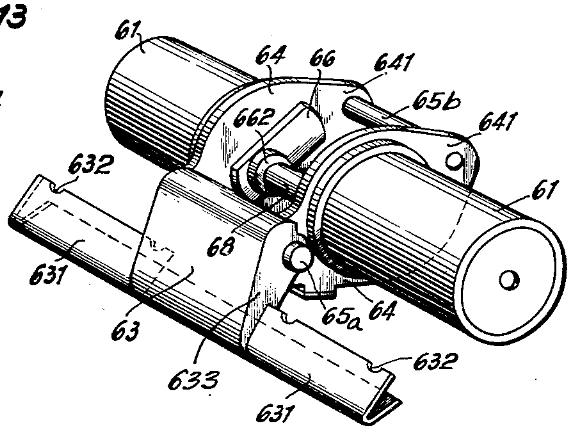
INVENTORS
KARL-HANS NEU
ERNST ROGNER
BY Michael S. Striker
Agt.

May 17, 1955 KARL-HANS NEU ET AL 2,708,290

DOUBLE BELT DRAWING MECHANISM

Filed Nov. 29, 1952 9 Sheets-Sheet 8

INVENTORS
KARL-HANS NEU
ERNST ROGNER

BY Michael S. Striker
Agt.

May 17, 1955 KARL-HANS NEU ET AL 2,708,290

DOUBLE BELT DRAWING MECHANISM

Filed Nov. 29, 1952 9 Sheets-Sheet 9

INVENTORS
KARL-HANS NEU
ERNST ROGNER
BY Michael S. Striker
Agt.

United States Patent Office 2,708,290

Patented May 17, 1955

2,708,290

DOUBLE BELT DRAWING MECHANISM

Karl-Hans Neu, Stuttgart, and Ernst Rogner, Stuttgart-Bad Cannstatt, Germany, assignors to Firma SKF Kugellagerfabriken Gesellschaft mit beschraenkter Haftung, Schweinfurt, Germany Application November 29, 1952, Serial No. 323,292

Claims priority, application Germany November 30, 1951

21 Claims. (Cl. 19—131)

The present invention relates to textile machinery, and in particular to double belt drawing mechanisms which are associated with a support, for the top rolls of drawing machines, which is turnable up from an operating position and which extends over the entire drawing field.

Known double belt drawing mechanisms are arranged in such a way that the top belts are provided with holders which are independently turnable upwardly from an operating position and are releasably locked to the bottom belt supporting mechanism when the drawing mechanism is in its operating position. With this arrangement there is a certain amount of inconvenience because the top belt arrangement must be operated separately from the other parts of the machinery.

One of the objects of the present invention is to overcome the above disadvantages by providing a double belt drawing mechanism which will separate the top belts from the bottom belts simultaneously with the turning of the top rolls support upwardly away from its operating position so that the forward and main drawing fields may be laid open with one simple operation.

A further object of the present invention is to mount the top belts on a guide means which is freely turnable on the top rolls support through a predetermined angle of less than 90° so that a force may be transmitted from the top rolls support to the top belts for pressing the same downwardly toward the bottom belts to greatly improve the drawing action.

Another object of the present invention is to provide a means for tensioning the top belts when they are in their operating position so as to compensate for lengthening of the top belts as they become used over a period of time.

An additional object of the present invention is to tension the top belts through the medium of a resilient means carried by the support for the top rolls.

Still another object of the present invention is to tension the top belts through the medium of a resilient means carried by the guide structure for the top belts.

With the above objects in view, the present invention mainly consists of a double belt drawing mechanism which includes a base means and a support means turnably mounted on the base means for movement downwardly toward and upwardly away from an operating position where the support means is located over the base means, this support means having a stop portion which remains stationary with respect to the support means when the latter is in its operating position. A top roll means is turnably carried by the support means for movement therewith to and from its operating position and has its axis of rotation located forwardly from the stop portion of the support means. An endless belt means is located about the top roll means and extends forwardly from ithe same in a direction substantially parallel to the drawing plane. A guide means engages the belt means to guide the same for movement and is mounted on a part of the top roll means for free turning movement about the same so that a front portion of the guide means and belt means, located forwardly of the top roll means, turns downwardly by gravity when the support means is turned upwardly away from its operating position. This guide means has a rear part located to the rear of the axis of the top roll means beneath the stop portion of the support means and at an angular distance therefrom of less than 90° about the axis of the top roll means when the support means is in its operating position, so that upon movement of the support means upwardly away from its operating position the rear part of the guide means engages the stop portion of the support means to limit the downward turning movement of the front portion of the guide means and belt means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 12 is a perspective view of part of the structure of Figs. 10 and 11;

Fig. 13 is a fragmentary, perspective view of a part of the structure of Figs. 10 and 11;

Figure 1:
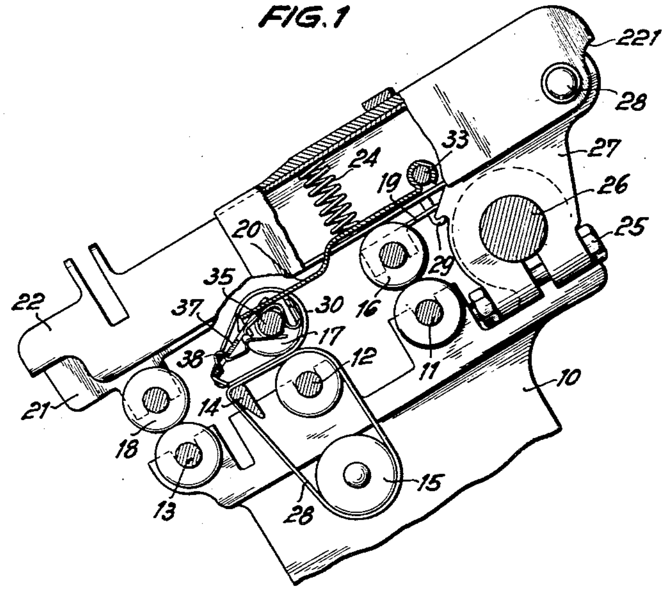
Fig. 1 is a fragmentary, partly sectional, side view of a double belt drawing mechanism constructed in accordance with the present invention.

Referring now to the drawings, Fig. 1 schematically illustrates a double belt drawing mechanism which includes a top belt arrangement corresponding to that embodiment of the invention which is illustrated in Figs. 2–5 and which will be described below. The structure of Fig. 1 includes a known base means 10 which turnably supports, in a known way, the pairs of bottom rolls 11, 12 and 13. On the central pair of bottom rolls 12 there are arranged a pair of bottom belts 28 which are guided over the guide rail 14 in a known way and which are tensioned by means of the tension roll 15 in a known way, this guide rail 14 being fixed to and forming part of the base means 10. The pairs of top rolls 16, 17 and 18 are turnably supported, in a known way, in guide arms 19, 20 and 21, respectively, these guide arms being resiliently supported on the top rolls support means 22, as is apparent from the central guide arm 20 which is turnably mounted on the pivot pin 33 fixed to the support 22 and urged downwardly by the spring 24.

A bracket 27 is fixed to a bar 26 of the base means 10 through the medium of a bolt and nut means 25 which draws together split portions of the bracket 27, the latter carrying a pivot pin 28 on which the support 22 is turnable. This support 22 is provided with a stop 221 which engages the bracket 27 to limit the turning movement of the support 22. The support 22 is releasably locked in its operating position through the medium of a known locking device 29. The top belt structure is located at the central pair of top rolls 17 in accordance with the structure of Figs. 2–5 described below.

In the several figures of the drawings, other than Fig. 1, the drawing plane is illustrated as being horizontal for the sake of convenience and clarity. It is to be understood, however, that the drawing plane actually is inclined forwardly and downwardly, as is apparent from Fig. 1.

Figure 2:
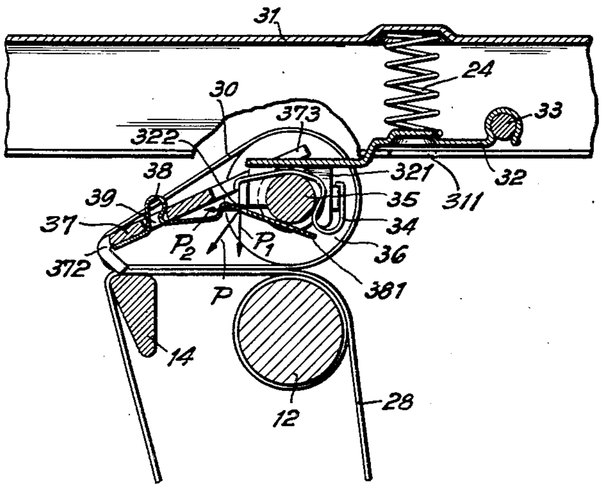
Fig. 2 is a fragmentary, sectional view taken along line 2—2 of Fig. 3 in the direction of the arrows.

In Fig. 2 there is fragmentarily shown only the central part of the top rolls support 31. A guide arm 32 is turnably carried by the pin 33 fixed to the support 31, and the spring 24 urges this guide arm 32 downwardly, the inwardly extending fingers 311 of the support 31 serving to limit the downward movement of the arm 32 under the influence of the spring 24. The arm 32 is provided with downwardly bent side portions 321 at its front end, and these side portions 321 are each formed with a U-shaped recess in which the spindle 35 of the top rolls 36 is located. The side portions 321 have inwardly extending projections on which the leaf spring 34 is mounted in the manner clearly illustrated in Fig. 2. This leaf spring 34 is shaped so as to engage the spindle 35 on its lower right hand side, as viewed in Fig. 2, so that the spindle 35, and the rolls 36 therewith, are carried by the arm 32 for upward and downward movement with the support 31 while being turnable with respect to the arm 32.

The bottom rolls 12, the guide rail 14, and the bottom belts 28 are shown in Fig. 2 and correspond to the same parts illustrated in Fig. 1. The tensioning roll 15 has been omitted from Fig. 2 and the further figures of the drawings.

The top belts 30 are guided by the top belt guide means 37, 38. Fig. 4 clearly shows the details of the part 37 of the top roll guide means which is in the form of a plate 37 having the rearwardly extending projections 373 and the forward projections 372 which extend forwardly from the front edge 371 of plate 37 and then extend downwardly and to the rear into engagement with the guide rail 14, as is apparent from Fig. 2. The forward edge 371 of plate 37 is rounded and engages the belts 30 so as to guide the same without injuring these top belts. The projections 372 are located closely adjacent to the side edges of the belts 30 so as to laterally guide the latter. Also, these projections 372 serve to locate the plate 37 at a predetermined distance from the guide rail 14. The rearwardly extending projections 373 rest on the spindle 35, as is apparent from Figs. 2 and 3.

The plate 37 is formed with an opening 39 adjacent to its front edge 371, and this opening receives a curved part of the leaf spring 38 (Figs. 2 and 5) so as to carry this leaf spring 38 which extends rearwardly beneath the arm 32 and is provided with a free rear end portion which bears against the rounded lower front edge 322 of the inwardly extending front projections of the downwardly bent parts 321 of the arm 32, as is clearly apparent from Fig. 2.

Figure 3:
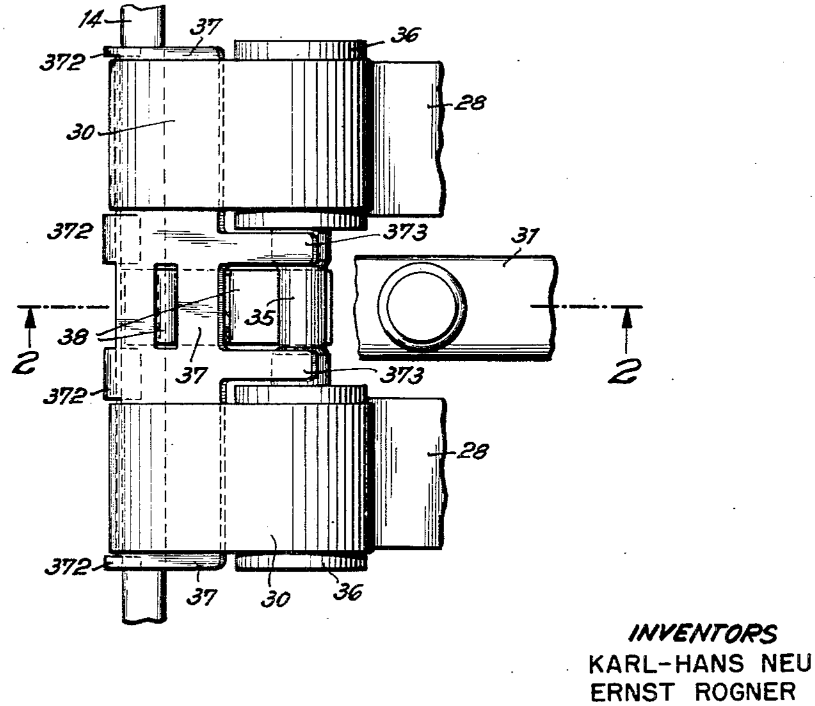
Fig. 3 is a top plan view, with parts cut away, of the structure of Fig. 2.
Figures 4, 5:
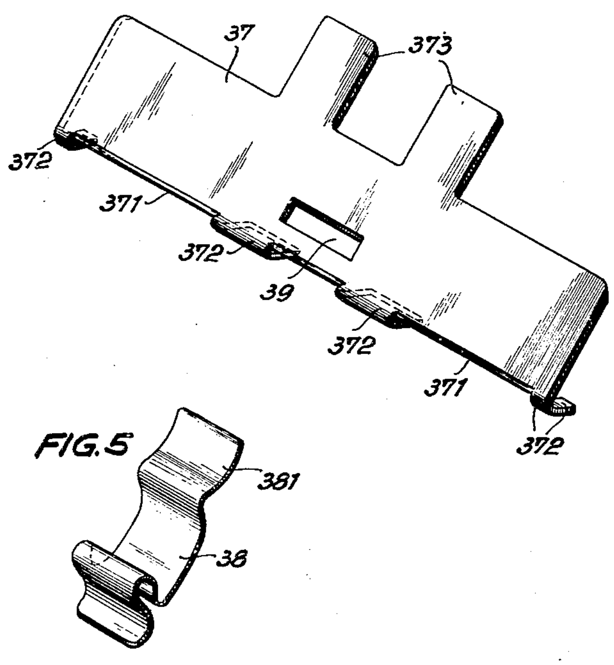
Fig. 4 is a perspective view of a part of the structure of Figs. 2 and 3.
Fig. 5 is a perspective view of another part of the structure of Figs. 2 and 3.

In the operating position of the apparatus, which is shown in Figs. 2 and 3, the leaf spring 38 presses against the rounded stationary portion 322 of arm 32 so as to produce a forwardly and downwardly directed force P acting on the plate 37, this force having the components $P_1$ and $P_2$, as shown in Fig. 2. The components $P_2$ act in a direction parallel to the drawing plane and tensions the top belts 30, while the component $P_1$ is directed downwardly toward the drawing plane and presses the plate 37 against the rail 14.

It is advantageous to apply the force of the spring 38 to the plate 37 rather than directly on the top belts because the gripping force of the belts is dependent upon many variables such as the resiliency of the parts, manufacturing tolerances, etc., and therefore the gripping force cannot be directly set as accurately as is desired without undesirably influencing the tension of the belts and without avoiding a turning of the plate 37 together with the belts 30 by frictional contact therewith. For these reasons a space is provided between the plate 37 and rail 14 through which the top belts move. The rovings are thus gripped only by the force derived from the stiffness of the top belts. The best possible stiffness condition of the top belts is obtained by turning these belts through a relatively small radius, and the length of the members 372 control the sharpness of the radius of the top belts 30 and can therefore maintain the gripping force resulting from the stiffness of the top belts at a desired value.

Upon upward turning movement of the top rolls support 31 from its operating position, the pair of top rolls 36 together with the top belts and top belt guide means are turned upwardly. During this action, the front portion of the top belts 30 and guide means 37, 38 tends to turn downwardly about the spindle 35 both by gravity and as a result of the force of spring 38. After turning in this manner through a predetermined angle, the extremity of the free end 381 of spring 38 engages the leaf spring 34 so as to prevent further turning of the top belt guide means 37, 38 and the top belts 30 therewith about the spindle 35.

On return movement of the top rolls support 31, the top rolls 36 together with the top belt guide means 37, 38 and the top belts 30 automatically assume the operating position illustrated in Fig. 2. Thus, the top belts become automatically tensioned and the projections 372 automatically become located in their proper position on the guide rail 14.

The leaf spring 38 may take forms different from that illustrated and described above and may be joined to the plate 37 in ways different from that described above. The important factor is that in all arrangements the spring should produce on the plate 37 a force directed downwardly toward the drawing plane, as shown by the component $P_1$, and in the direction of the drawing plane, as shown by the component $P_2$ of Fig. 2. Where a particularly weak spring is used it is possible to omit the projections 372 because these projections limit the movement of plate 37 in a downward direction under the influence of the spring 38, and if this spring is weak enough to provide only a limited downward force which will not cause the front edge of plate 37 to engage the lowermost part of the belts 30, then the downwardly extending portions of the projections 372 may be omitted.

Figure 8:
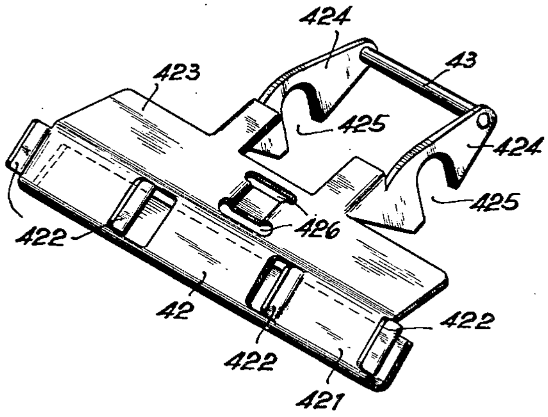
Fig. 8 is a perspective view of a part of the structure of Figs. 6 and 7.
Figure 9:
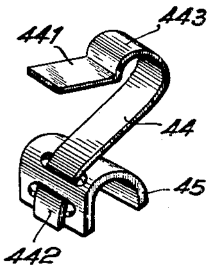
Fig. 9 is a perspective view of another part of the structure of Figs. 6 and 7.

Figs. 6–9 of the drawings illustrate a further embodiment of the invention wherein the top rolls support 31, pivot pin 33, fingers 311, spring 24, and leaf spring 34 are identical with the elements designated with the same numerals in the embodiment of Figs. 2–5. The guide arm 41 is identical in all respects with the guide arm 32 of Fig. 2 except that this guide arm 41 includes a front extension 412 for a purpose to be described below. The downwardly bent side portions 411 of the arm 41 are identical with the side portions of the arm 32 and include inwardly extending projections on which the leaf spring 34 is mounted, these side portions 411 being formed with U-shaped recesses in which the spindle 47 of the top rolls 48 is located. The top belts 51 are located about the top rolls 48 and extend forwardly therefrom, these top belts being guided by a guide means the details of which are best illustrated in Figs. 8 and 9.

As is apparent from Fig. 8, the guide means for the top belts includes a front plate 42 which is bent backwardly upon itself to produce a curved front edge portion 421 for engaging the belts 51 at their front ends. At its opposite sides the plate 42 is provided with a pair of upwardly extending ears 422 for respectively guiding the outer side edges of the belts 51, and between these two outer ears 422 the plate 42 is provided with a pair of additional ears 422 struck upwardly from the material of plate 42 to respectively guide the inner side edges of the belts 51. The plate 42 is further provided at its top portion 423 with downwardly bent side portions 424 formed with U-shaped recesses 425 which straddle the spindle 47 of the top rolls 48. At its rear end portion, the side plate parts 424 are interconnected by a cross rod 43.

Figure 6:
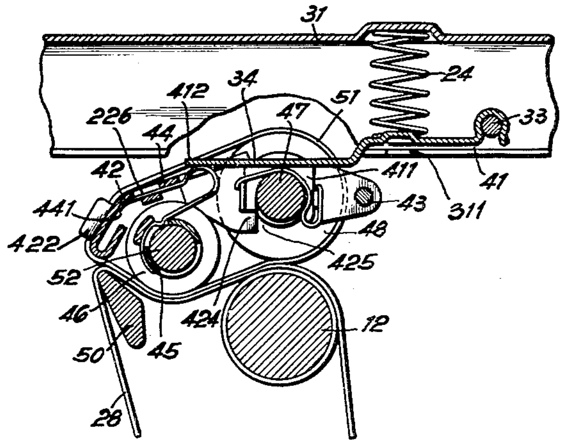
Fig. 6 is a fragmentary, side sectional view taken along line 6—6 of Fig. 7 in the direction of the arrows and illustrating an embodiment of the invention different from that of Figs. 2–5.
Figure 7:
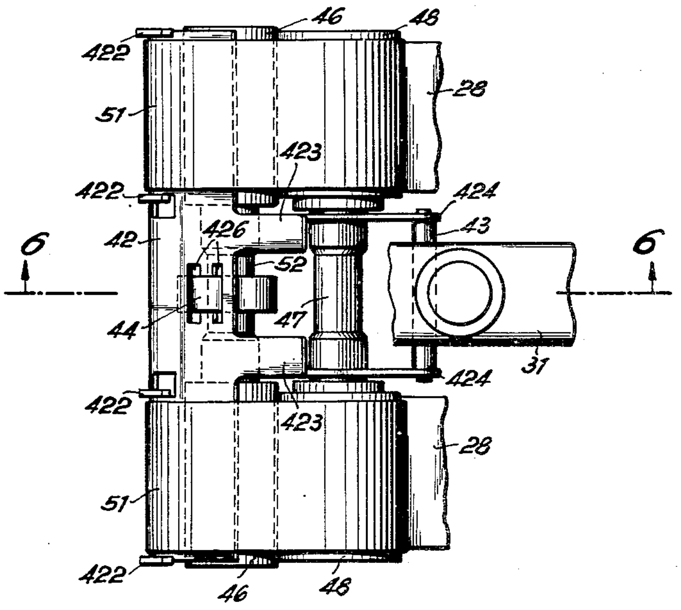
Fig. 7 is a top plan view, with parts broken away, of the structure of Fig. 6.

At a central portion distant from the front edge 421, the plate 42 is formed with a pair of slots 426, and the material located between these slots is pressed downwardly to form a support for the free end 441 of a leaf spring 44 which is provided with an intermediate curved portion 443 extending upwardly from the free end 441 and located in engagement with the front extension 412 of the arm 41, as is clearly apparent from Fig. 6. At its lower free end 442, the leaf spring 44 is connected to a saddle member 45 by passing through slots thereof, the member 45 having the configuration of a U-shaped channel. This member 45 is located on and against a spindle 52 of a pair of tension rolls 46 which are urged downwardly against the top belts to transmit a force therefrom to the bottom belts, as is clearly apparent from Fig. 6.

As is shown in Fig. 6 the bottom belts 28 are guided over the bottom rolls 12 in the same way as was described above, and a guide rail 50 is fixed to the base means in the same way as the guide rail 14 described above, the guide rail 50 being positioned differently from the guide rail 14 and having a different configuration than the same so as to better guide the top and bottom belts in cooperation with the tension rolls 46.

As is apparent from Fig. 6, in the operating position of the apparatus the spring 24 transmits its force through the arm 41 and the forward end portion 412 thereof to the leaf spring 44 which transmits its own force and that of spring 24 to the tension rolls 46 which press downwardly on the top belts 51 in the manner shown in Fig. 6.

Upon upward turning movement of the top rolls support 31 from its operating position, the arm 41 is carried upwardly therewith and carries the top rolls 48, the belts 51, and the above-described guide and tension means therefor upwardly away from the bottom belts 28. The portion of the belts 51 and guide means therefor located forwardly of the spindle 47 turn downwardly about the latter until the cross rod 43 engages the arm 41, and it will be noted that in the operating position of the parts the rod 43 is located from the arm 41 by an angular distance about the spindle 47 of less than 90°, in the same way as the above-described embodiments of the invention. Thus, when the parts are again returned to the operating position illustrated in Fig. 6, they automatically assume the operating position shown therein.

Figs. 10–13 illustrate a further embodiment of the invention. In the construction of Figs. 10–13, the parts 24, 31, 311, 32, 33, 12, 14 and 28 are identical with those parts of the embodiment of Figs. 2–5 which carry the same reference numerals. The guide arm 32 is provided with downwardly bent side portions identical with the guide arm 32 of Fig. 2 and provided in the same way with inwardly extending projections on which the leaf spring 34 is mounted, this leaf spring 34 engaging the spindle 68 of the top rolls 61 to rotatably support the latter on the arm 32 for upward and downward movement therewith. The top belts 60 extend about the rolls 61 and extend forwardly therefrom.

Figure 10:
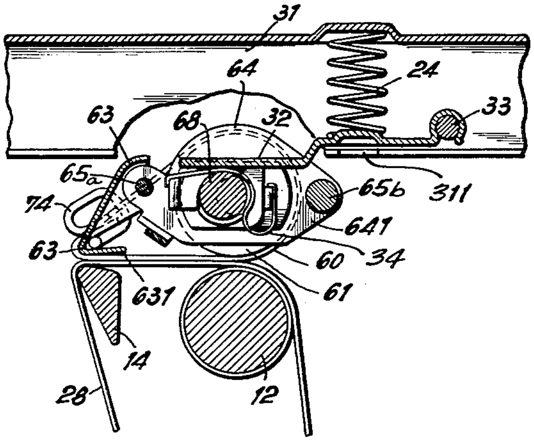
Fig. 10 is a sectional view taken along line 10—10 of Fig. 11 in the direction of the arrows and illustrating a further embodiment of the invention.
Figure 11:
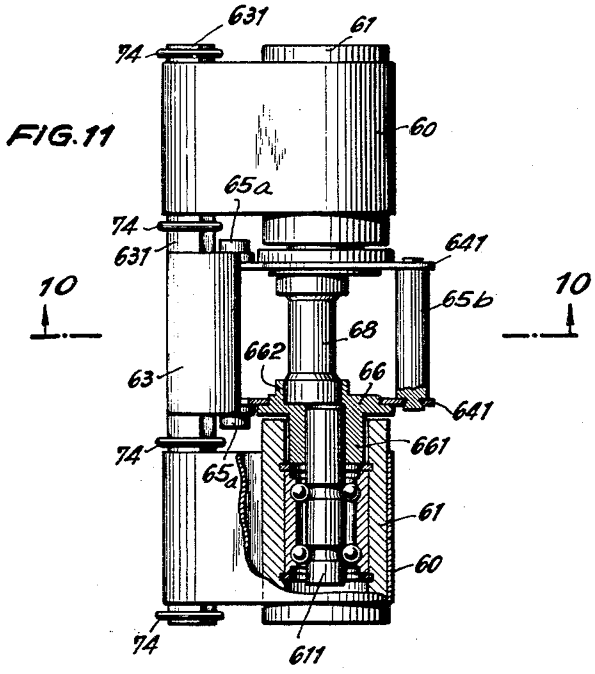
Fig. 11 is a top plan view, partly in section, of part of the structure of Fig. 10.

The top belts 60 are guided by a guide means the details of which are most clearly shown in Figs. 11 and 12. As is apparent from these figures and Fig. 10, the spindle 68 is not coaxial with the axis of the top rolls 61. The axis of spindle 68 is located forwardly from the axis of the top rolls 61, and the spindle 68 is turnably carried by a pair of members 66 which have inner recesses 662 in which the opposite ends of the spindle 68 are respectively located for free rotation. Spindle 68 has a central portion of reduced diameter in engagement with arm 32. The members 66 each have a tubular portion 661 in which the shaft 611 of each of the top rolls 61 is fixedly located, and, as is apparent from the sectional part of Fig. 11, the shafts 611 turnably carry the top rolls 61 through the medium of ball bearings.

The guide means for the top belts 60 takes the form of a front plate portion 63 which is curved backwardly upon itself at 631 to provide a forward smooth curved edge along which the belts 60 move. As is apparent from Figs. 12 and 13, the opposite side portions of the front edge 631, which actually engage the belts 660, are curved more sharply than the central portion of the plate 63 and are formed at their top edges with the notches 632 which serve to locate the wire guide members 74 on these opposite side portions of front edge 631 in the manner shown in Fig. 13. These wire members 74 have opposite side parts which are associated with the side edges of the belts 60 to laterally guide the same, as is clearly apparent from Fig. 11.

Between the sharply curved side parts of the plate 63 and the central portion thereof, there are fixed to the plate 63 side plates 633 which carry a pin *65a*. On this pin *65a* there are pivotally mounted a pair of side plates 64 which are interconnected at their rear end portions 641 by a second pin *65b* located at the rear end portion of the guide means. The side plates 64 are respectively formed with substantially rectangular openings in which substantially rectangular projections of the members 66 are located, as is clearly apparent from Figs. 11 and 12, so that the side plates 64 are constrained to turn with the members 66.

When the above-described apparatus is in the operating position shown in Fig. 10, the spring 24 transmits its force to the arm 32 and to the spindle 68 which, as a result of its eccentric location with respect to the axis of top rolls 61, tends to turn about this axis. Through the pivotal connection of parts 63 and 64, at the pivot pin *65a*, this force of spring 24 tends to move the front plate portion 63 forwardly and downwardly so that the above-described arrangement enables the spring 24 both to tension the top belts 60 and to urge the latter downwardly toward the bottom belts 28, the parts 63, 64 and *65a* acting in the nature of a toggle joint.

Figure 14:
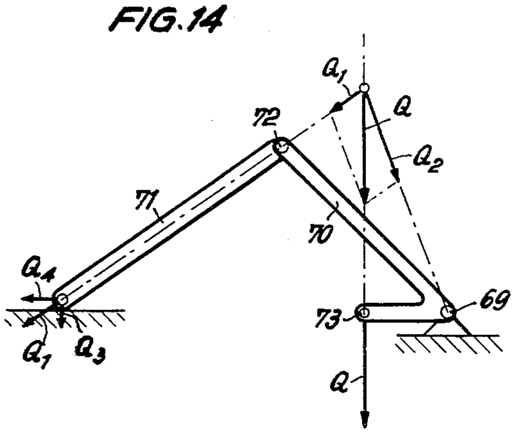
Fig. 14 is a diagrammatic representation of the operation of the structure of Figs. 10–12.

This operation is schematically represented in Fig. 14 where the turning axis of the top rolls is shown at 69, the the members 64 are represented at 70, the front plate 63 is represented at 71, and the pivot 72 represents the axis of pivot pin *65a* while 73 represents the axis of spindle 68 on which the force of spring 24 acts through the arm 32. This force Q acts in a substantially vertical downward direction and may be divided into components $Q_1$ and $Q_2$, and, as is shown in Fig. 14, the component $Q_1$ respectively urges the front plate 63 forwardly and downwardly with the forces $Q_4$ and $Q_3$ which are respectively parallel and perpendicular to the drawing plane.

In the same way as with the above-described embodiments of the invention, the raising of the top rolls support 31 will free the entire top belt mechanism for turning movement in a counterclockwise direction about the spindle 68, as viewed in Fig. 10, and the cross rod *65b* will engage the arm 32 to limit such turning movement, this rod *65b* being located, in the operating position of the parts, at an angular distance from the arm 32 of less than 90° about the axis of spindle 68 so that when the parts are returned to their operating position they will automatically assume the position illustrated in Fig. 10.

Figure 15:
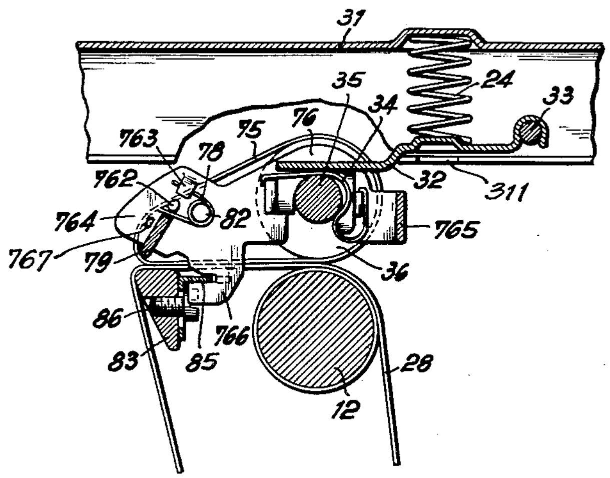
Fig. 15 is a fragmentary, side sectional view of still another embodiment of the present invention.
Figure 16:
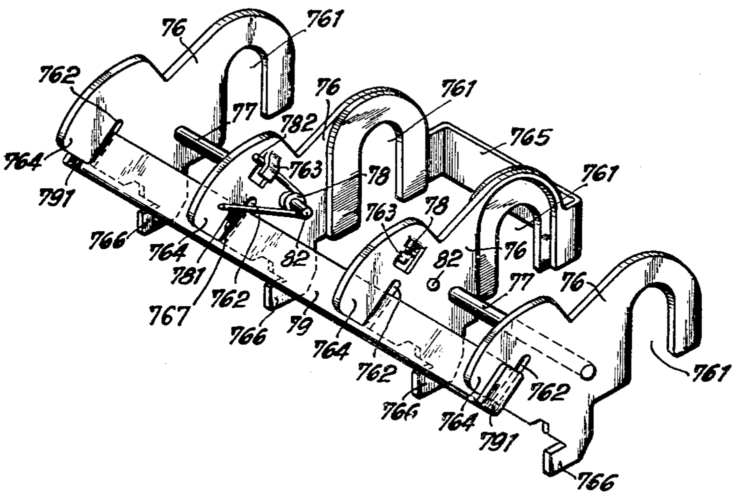
Fig. 16 is a perspective view of a part of the structure of Fig. 15.

Figs. 15 and 16 illustrate a fourth embodiment of the invention wherein the parts 12, 28, 31, 311, 32, 33, 24 and 34 are all identical with those like-numbered parts of the embodiment of the invention illustrated in Fig. 2. Also, the spindle 35 and top rolls 36 are identical with the like-numbered parts of Fig. 2.

In the embodiment of Figs. 15 and 16, the top belts 75 extend about the top rolls 36 and forwardly therefrom, these top belts 75 being guided by a guide means the details of which are clearly shown in Figs. 15 and 16. This guide means includes four side plates 76 respectively located in parallel planes which are normal to the drawing plane and provided at their rear portions with U-shaped recesses 761 in which the spindle 35 is turnably located. At their forward extensions 764, the plates 76 are formed with notches 762 in which a front plate 79, extending across both belts 75, is movably mounted, this plate 79 having a forward curved edge for slidably engaging the belts 75 and having opposite upwardly bent ends 791 which engage the outer side surfaces of the outermost side plates 76 to prevent lateral shifting of the member 79. The two inner side plates 76 are interconnected by a rear strip 765 and are formed forwardly of their recesses 761 with inwardly struck tongues 763, respectively, as is clearly apparent from Fig. 16. The outermost side plates 76 are fixedly connected to the two center side plates 76 by the rods 77, and the center side plates 76 each have fixedly mounted thereon an inwardly extending pin 82 about which a central part of a spring 78 is coiled, each of these springs 78 have opposite free ends 781 and 782. The free ends 782 are respectively located between tongues 763 and the plates from which they are struck and the free ends 781 of springs 78 bear against the rear edge of plate 79 to urge the latter downwardly and forwardly with respect to the drawing plane in accordance with the direction of the notches 762. As is apparent from Figs. 15 and 16, each of the side plates 76 includes a lowermost downwardly extending hook-shaped portion 766.

The rail 14 of the embodiment of Fig. 2 is replaced in the embodiments of Figs. 15 and 16 by a guide rail 83 which cooperates in the same way as rail 14 with the bottom belts 28. This guide rail 83 has fixedly mounted on its rear face, through the medium of screw members 86, an angle bar 85 the top side of which is parallel to the drawing plane and cooperates with the hook-shaped portions 766 to releasably hold the plates 76 in a predetermined operating position.

When the apparatus of Figs. 15 and 16 is moved from the operating position shown in Fig. 15, during the first part of the upward turning movement of the top rolls support 31, the portion of the top belts 75 and guide means therefor located forwardly of the spindle 35 turns downwardly about spindle 35 by engagement of the hook portions 766 with the angle bar 85. After a short turning movement in this manner, the hook portions 766 automatically slide across the right edge of angle bar 85, as viewed in Fig. 15, so as to automatically release the top belt mechanism from the bottom belt mechanism. During this turning movement of the top belt mechanism, the strip 765 approaches the guide arm 32 and after release of the top belt mechanism from the bottom belt mechanism the top belt mechanism turns freely, by gravity, until the strip 765 engages the guide arm 32, this strip 765 being located from the arm 32, in the operative position of the parts, by an angular distance of less than 90° about the axis of spindle 35.

During this movement of the top belt mechanism from its operating position, the front plate 79 is released to the influence of springs 78 which tend to move the plate 79 out of the notches 762. This outward movement of the plate 79 may be limited either by making the springs 78 too weak to move the plate 79 out of notches 762 or by providing on the inner faces of the inner side plates 76 stops 767 which engage the free ends 781 of the springs 78 to limit the extent to which the latter may move the plate 79 out of the notches 762.

During return of the parts to their operating position, the lowermost point of the top belts 75 will engage the top belts 28 and move forwardly along the latter so as to turn the top belt guide means in a clockwise direction about the spindle 35, as viewed in Fig. 15, and the lock members 76 in this way automatically engage the angle bar 85 and the apparatus again becomes automatically located in the operating position shown in Fig. 15.

It will be seen from Fig. 15, that the forward portions 764 of the plates 76 extend above the belts 75 to laterally guide the latter, while the lower portions of the plates 76 extend below the top part of the bottom belts 28 to simultaneously guide the latter together with the top belts 75.

Also, in the operating position of the parts, the springs 78 act on the plate 79 to cause the latter to tension the top belts 75 and to urge the latter downwardly toward the bottom belts. It will be seen that the force of the springs 78 acting through plate 79 together with the stiffness of the top belts 75 tend to turn the top belts and the guide means therefor in a clockwise direction about the spindle 35, as viewed in Fig. 15, but this tendency is limited by engagement of the hook portions 766 with the angle bar 85 so that the hook portions 766 are constantly pressed against the under face of the top side of angle bar 85, and in this way the guide means is maintained at a predetermined position with respect to the bottom belt mechanism.

It will be understood that each of the elements described above, or two or more together, may also find a useful application in other types of double belt drawing mechanism for textile machines differing from the types described above.

While the invention has been illustrated and described as embodied in an automatically releasable and engageable double belt drawing mechanism for textile machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a double belt drawing mechanism for textile machines, in combination, base means; support means turnably mounted on said base means for movement downwardly toward and upwardly away from an operating position where said support means is located over said base means, said support means having a stop portion which remains stationary with respect to said support means when the latter is in said operating position thereof; top roll means turnably carried by said support means for movement therewith to and from said operating position and having its axis of rotation located forwardly from said stop portion of said support means; endless belt means located about said top roll means and extending forwardly from the same in a direction substantially parallel to the drawing plane; and guide means engaging said belt means to guide the same for movement and being mounted on a part of said top roll means for free turning movement about the same so that a front portion of said guide means and belt means, located forwardly of said top roll means, turns downwardly by gravity when said support means is turned upwardly away from said operating position thereof, said guide means having a rear part thereof located to the rear of said axis of said top roll means beneath said stop portion of said support means and at an angular distance therefrom of less than 90° about said axis of said top roll means when said support means is in said operating position thereof, so that upon movement of said support means upwardly away from said operating position thereof said rear part of said guide means engages said stop portion of said support means to limit the downward turning movement of said front portion of said guide means and belt means.

2. In a double belt drawing mechanism for textile machines, in combination, base means; support means turnably mounted on said base means for movement downwardly toward and upwardly away from an operating position where said support means is located over said base means, said support means having a stop portion which remains stationary with respect to said support means when the latter is in said operating position thereof; top roll means turnably carried by said support means for movement therewith to and from said operating position and having its axis of rotation located forwardly from said stop portion of said support means; endless belt means located about said top roll means and extending forwardly from the same in a direction substantially parallel to the drawing plane; and guide means engaging said belt means to guide the same for movement and being mounted on a part of said top roll means for free turning movement about the same so that a front portion of said guide means and belt means, located forwardly of said top roll means, turns downwardly by gravity when said support means is turned upwardly away from said operating position thereof, said guide means having a rear part thereof located to the rear of said axis of said top roll means beneath said stop portion of said support means and at an angular distance therefrom of less than 90° about said axis of said top roll means when said support means is in said operating position thereof, so that upon movement of said support means upwardly away from said operating position thereof said rear part of said guide means engages said stop portion of said support means to limit the downward turning movement of said front portion of said guide means and belt means, said guide means having a forward edge portion engaging said belt means and being movable in a forward and downward direction with respect to said axis of said top roll means; and spring means operatively connected to said forward edge portion of said guide means for urging the same forwardly and downwardly with respect to said axis of said top roll means.

3. In a double belt drawing mechanism for textile machines, in combination, base means; support means turnably mounted on said base means for movement downwardly toward and upwardly away from an operating position where said support means is located over said base means, said support means having a stop portion which remains stationary with respect to said support means when the latter is in said operating position thereof; top roll means turnably carried by said support means for movement therewith to and from said operating position and having its axis of rotation located forwardly from said stop portion of said support means; endless belt means located about said top roll means and extending forwardly from the same in a direction substantially parallel to the drawing plane; guide means engaging said belt means to guide the same for movement and being mounted on a part of said top roll means for free turning movement about the same so that a front portion of said guide means and belt means, located forwardly of said top roll means turns downwardly by gravity when said support means is turned upwardly away from said operating position thereof, said guide means having a rear part thereof located to the rear of said axis of said top roll means beneath said stop portion of said support means and at an angular distance therefrom of less than 90° about said axis of said top roll means when said support means is in said operating position thereof, so that upon movement of said support means upwardly away from said operating position thereof said rear part of said guide means engages said stop portion of said support means to limit the downward turning movement of said front portion of said guide means and belt means, said guide means having a forward edge portion engaging said belt means and being movable in a forward and downward direction with respect to said axis of said top roll means; and spring means operatively connected to said forward edge portion of said guide means for urging the same forwardly and downwardly with respect to said axis of said top roll means, said spring means forming part of said guide means.

4. In a double belt drawing mechanism for textile machines, in combination, base means; support means turnably mounted on said base means for movement downwardly toward and upwardly away from an operating position where said support means is located over said base means, said support means having a stop portion which remains stationary with respect to said support means when the latter is in said operating position thereof; top roll means turnably carried by said support means for movement therewith to and from said operating position and having its axis of rotation located forwardly from said stop portion of said support means; endless belt means located about said top roll means and extending forwardly from the same in a direction substantially parallel to the drawing plane; guide means engaging said belt means to guide the same for movement and being mounted on a part of said top roll means for free turning movement about the same so that a front portion of said guide means and belt means, located forwardly of said top roll means, turns downwardly by gravity when said support means is turned upwardly away from said operating position thereof, said guide means having a rear part thereof located to the rear of said axis of said top roll means beneath said stop portion of said support means and at an angular distance therefrom of less than 90° about said axis of said top roll means when said support means is in said operating position thereof, so that upon movement of said support means upwardly away from said operating position thereof said rear part of said guide means engages said stop portion of said support means to limit the downward turning movement of said front portion of said guide means and belt means, said guide means having a forward edge portion engaging said belt means and being movable in a forward and downward direction with respect to said axis of said top roll means, and spring means operatively connected to said forward edge portion of said guide means for urging the same forwardly and downwardly with respect to said axis of said top roll means, said spring means forming part of said support means.

5. In a double belt drawing mechanism for textile machines, in combination, base means; support means turnably mounted on said base means for movement downwardly toward and upwardly away from an operating position where said support means is located over said base means, said support means having a stop portion which remains stationary with respect to said support means when the latter is in said operating position thereof; top roll means turnably carried by said support means for movement therewith to and from said operating position and having its axis of rotation located forwardly from said stop portion of said support means, said top roll means comprising a pair of rolls coaxial with and spaced from each other and a spindle located between said pair of rolls and being connected thereto; endless belt means located about said top roll means and extending forwardly from the same in a direction substantially parallel to the drawing plane; and guide means engaging said belt means to guide the same for movement and being mounted on said spindle of said top roll means for free turning movement about the same so that a front portion of said guide means and belt means, located forwardly of said top roll means, turns downwardly by gravity when said support means is turned upwardly away from said operating position thereof, said guide means having a rear part thereof located to the rear of said axis of said top roll means beneath said stop portion of said support means and at an angular distance therefrom of less than 90° about said axis of said top roll means when said support means is in said operating position thereof, so that upon movement of said support means upwardly away from said operating position thereof said rear part of said guide means engages said stop portion of said support means to limit the downward turning movement of said front portion of said guide means and belt means.

6. In a double belt drawing mechanism for textile machines, in combination, base means; support means turnably mounted on said base means for movement downwardly toward and upwardly away from an operating position where said support means is located over said base means, said support means having a stop portion which remains stationary with respect to said support means when the latter is in said operating position thereof; top roll means turnably carried by said support means for movement therewith to and from said operating position and having its axis of rotation located forwardly from said stop portion of said support means, said top roll means comprising a pair of rolls coaxial with and spaced from each other and a spindle located between said pair of top rolls and being coaxial with and fixedly connected thereto; endless belt means located about said top roll means and extending forwardly from the same in a direction substantially parallel to the drawing plane; and guide means engaging said belt means to guide the same for movement and being mounted on said spindle of said top roll means for free turning movement about the same so that a front portion of said guide means and belt means, located forwardly of said top roll means, turns downwardly by gravity when said support means is turned upwardly away from said operating position thereof, said guide means having a rear part thereof located to the rear of said axis of said top roll means beneath said stop portion of said support means and at an angular distance therefrom of less than 90° about said axis of said top roll means when said support means is in said operating position thereof, so that upon movement of said support means upwardly away from said operating position thereof said rear part of said guide means engages said stop portion of said support means to limit the downward turning movement of said front portion of said guide means and belt means.

7. In a double belt drawing mechanism for textile machines, in combination, base means; support means turnably mounted on said base means for movement downwardly toward and upwardly away from an operating position where said support means is located over said base means, said support means having a stop portion which remains stationary with respect to said support means when the latter is in said operating position thereof; top roll means turnably carried by said support means for movement therewith to and from said operating position and having its axis of rotation located forwardly from said stop portion of said support means, said top roll means comprising a pair of rolls coaxial with and spaced from each other and a spindle located between said pair of rolls, being connected thereto, and having an axis parallel to the axis of said top rolls; endless belt means located about said top roll means and extending forwardly from the same in a direction substantially parallel to the drawing plane; and guide means engaging said belt means to guide the same for movement and being mounted on said spindle of said top roll means for free turning movement about the same so that a front portion of said guide means and belt means, located forwardly of said top roll means, turns downwardly by gravity when said support means is turned upwardly away from said operating position thereof, said guide means having a rear part thereof located to the rear of said axis of said top roll means beneath said stop portion of said support means and at an angular distance therefrom of less than 90° about said axis of said top roll means when said support means is in said operating position thereof, so that upon movement of said support means upwardly away from said operating position thereof said rear part of said guide means engages said stop portion of said support means to limit the downward turning movement of said front portion of said guide means and belt means.

8. In a double belt drawing mechanism for textile machines, in combination, base means; support means turnably mounted on said base means for movement downwardly toward and upwardly away from an operating position where said support means is located over said base means, said support means having a stop portion which remains stationary with respect to said support means when the latter is in said operating position thereof; top roll means turnably carried by said support means for movement therewith to and from said operating position and having its axis of rotation located forwardly from said stop portion of said support means, said top roll means comprising a pair of rolls coaxial with and spaced from each other and a spindle located between said pair of rolls and being connected thereto; endless belt means located about said top roll means and extending forwardly from the same in a direction substantially parallel to the drawing plane; guide means engaging said belt means to guide the same for movement and being mounted on said spindle of said top roll means for free turning movement about the same so that a front portion of said guide means and belt means, located forwardly of said top roll means, turns downwardly by gravity when said support means is turned upwardly away from said operating position thereof, said guide means having a rear part thereof located to the rear of said axis of said top roll means beneath said stop portion of said support means and at an angular distance therefrom of less than 90° about said axis of said top roll means when said support means is in said operating position thereof, so that upon movement of said support means upwardly away from said operating position thereof said rear part of said guide means engages said stop portion of said support means to limit the downward turning movement of said front portion of said guide means and belt means, said guide means having a forward edge portion engaging said belt means and being movable in a forward and downward direction with respect to said axis of said top roll means; and spring means operatively connected to said forward edge portion of said guide means for urging the same forwardly and downwardly with respect to said axis of said top roll means.

9. In a double belt drawing mechanism for textile machines, in combination, base means; support means turnably mounted on said base means for movement downwardly toward and upwardly away from an operating position where said support means is located over said base means, said support means having a stop portion which remains stationary with respect to said support means when the latter is in said operating position thereof; top roll means turnably carried by said support means for movement therewith to and from said operating position and having its axis of rotation located forwardly from said stop portion of said support means, said top roll means comprising a pair of rolls coaxial with and spaced from each other and a spindle located between said pair of rolls and being connected thereto;

endless belt means located about said top roll means and extending forwardly from the same in a direction substantially parallel to the drawing plane; guide means engaging said belt means to guide the same for movement and being mounted on said spindle of said top roll means for free turning movement about the same so that a front portion of said guide means and belt means, located forwardly of said top roll means, turns downwardly by gravity when said support means is turned upwardly away from said operating position thereof, said guide means having a rear part thereof located to the rear of said axis of said top roll means beneath said stop portion of said support means and at an angular distance therefrom of less than 90° about said axis of said top roll means when said support means is in said operating position thereof, so that upon movement of said support means upwardly away from said operating position thereof said rear part of said guide means engages said stop portion of said support means to limit the downward turning movement of said front portion of said guide means and belt means, said guide means having a forward edge portion engaging said belt means and being movable in a forward and downward direction with respect to said axis of said top roll means; and spring means operatively connected to said forward edge portion of said guide means for urging the same forwardly and downwardly with respect to said axis of said top roll means, said spring means forming part of said guide means.

10. In a double belt drawing mechanism for textile machines, in combination, base means; support means turnably mounted on said base means for movement downwardly toward and upwardly away from an operating position where said support means is located over said base means, said support means having a stop portion which remains stationary with respect to said support means when the latter is in said operating position thereof; top roll means turnably carried by said support means for movement therewith to and from said operating position and having its axis of rotation located forwardly from said stop portion of said support means, said top roll means comprising a pair of rolls coaxial with and spaced from each other and a spindle located between said pair of rolls and being connected thereto; endless belt means located about said top roll means and extending forwardly from the same in a direction substantially parallel to the drawing plane; guide means engaging said belt means to guide the same for movement and being mounted on said spindle of said top roll means for free turning movement about the same so that a front portion of said guide means and belt means, located forwardly of said top roll means, turns downwardly by gravity when said support means is turned upwardly away from said operating position thereof, said guide means having a rear part thereof located to the rear of said axis of said top roll means beneath said stop portion of said support means and at an angular distance therefrom of less than 90° about said axis of said top roll means when said support means is in said operating position thereof, so that upon movement of said support means upwardly away from said operating position thereof said rear part of said guide means engages said stop portion of said support means to limit the downward turning movement of said front portion of said guide means and belt means, said guide means having a forward edge portion engaging said belt means and being movable in a forward and downward direction with respect to said axis of said top roll means; and spring means operatively connected to said forward edge portion of said guide means for urging the same forwardly and downwardly with respect to said axis of said top roll means, said spring means forming part of said support means.

11. In a double belt drawing mechanism for textile machines, in combination, base means; support means turnably mounted on said base means for movement downwardly toward and upwardly away from an operating position where said support means is located over said base means, said support means including a pivot pin parallel to the drawing plane, elongated arm means extending forwardly from said pivot pin and being turnably connected thereto, and a first spring connected to said arm means for urging the same downwardly toward the drawing plane; top roll means turnably carried for rotation about its axis by said support means for movement therewith to and from said operating position, said top roll means including a pair of top rolls respectively located on opposite sides of said arm means and a spindle located between and fixed to said top rolls coaxially therewith and being connected to said arm means to be carried thereby; endless belt means located about said top roll means and extending forwardly from the same in a direction substantially parallel to the drawing plane; and guide means engaging said belt means to guide the same for movement, said guide means including a front plate portion having a front edge substantially parallel to the drawing plane and engaging said belt means, a pair of parallel spaced side plate portions extending rearwardly from said front plate portion, being fixedly connected thereto, being located in planes normal to the drawing plane, and each having a substantially U-shaped recess extending upwardly from a bottom edge thereof and in which said spindle of said top roll means is located, said side plate portions extending to the rear of said spindle, limiting means in the form of an elongated member parallel to the drawing plane, being fixed to and extending between said side plate portions and being located to the rear of said spindle beneath said arm means to engage the latter to limit turning movement of said guide means and said belt means when said support means is moved upwardly away from said operating position thereof, tension roller means engaging said belt means, and a second spring connecting said tension roller means to said front plate portion of said guide means.

12. In a double belt drawing mechanism for textile machines, in combination, base means; support means turnably mounted on said base means for movement downwardly toward and upwardly away from an operating position where said support means is located over said base means, said support means including a pivot pin parallel to the drawing plane, elongated arm means extending forwardly from said pivot pin and being turnably connected thereto, and a first spring connected to said arm means for urging the same downwardly toward the drawing plane; top roll means turnably carried for rotation about its axis by said support means for movement therewith to and from said operating position, said top roll means including a pair of top rolls respectively located on opposite sides of said arm means and a spindle located between and fixed to said top rolls coaxially therewith and being connected to said arm means to be carried thereby; endless belt means located about said top roll means and extending forwardly from the same in a direction substantially parallel to the drawing plane; and guide means engaging said belt means to guide the same for movement, said guide means including a front plate portion having a front edge substantially parallel to the drawing plane and engaging said belt means, a pair of parallel spaced side plate portions extending rearwardly from said front plate portion, being fixedly connected thereto, being located in planes normal to the drawing plane, and each having a substantially U-shaped recess extending upwardly from a bottom edge thereof and in which said spindle of said top roll means is located, said side plate portions extending to the rear of said spindle, limiting means in the form of an elongated member parallel to the drawing plane, being fixed to and extending between said side plate portions and being located to the rear of said spindle beneath said arm means to engage the latter to limit turning movement of said guide means and said belt means when said support means is moved upwardly away from said operating position thereof, tension roller means engaging said belt means, and a second spring connecting said tension roller means to said front plate portion of said guide means, said second spring means being substantially U-shaped at an intermediate portion thereof and having said intermediate portion thereof located beneath and engaging said arm means to urge said front plate portion of said guide means and said tension roller means downwardly toward the drawing plane.

13. In a double belt drawing mechanism for textile machines, in combination, base means; support means turnably mounted on said base means for movement downwardly toward and upwardly away from an operating position where said support means is located over said base means, said support means including a pivot pin parallel to the drawing plane, elongated arm means extending forwardly from said pivot pin and being turnably connected thereto, and a spring connected to said arm means for urging the same downwardly toward the drawing plane; top roll means turnably carried for rotation about its axis by said support means for movement therewith to and from an operating position, said top roll means including a pair of hollow top rolls respectively located along said rotation axis on opposite sides of said arm means and each having an open inner end facing said arm means, a pair of shafts respectively located along said rotation axis within and turnably supporting said hollow top rolls and respectively having free end portions extending beyond said inner ends of said top rolls, a pair of tubular members fixedly connected to said free end portions of said shafts, respectively, and a spindle extending between and being turnably connected to said tubular members and having an axis parallel to and spaced from said rotation axis, said spindle being connected to said arm means to be carried thereby; endless belt means located about said top roll means and extending forwardly from the same in a direction substantially parallel to the drawing plane; and guide means engaging said belt means to guide the same for movement, said guide means including a front plate portion having a front edge substantially parallel to the drawing plane and engaging said belt means, a pair of parallel spaced side plate portions extending rearwardly from said front plate portion, being pivotally connected thereto for turning movement with respect to the same about an axis parallel to the drawing plane, being respectively fixed to said tubular members, and extending to the rear of said spindle, and limiting means in the form of a rod parallel to the drawing plane, fixed to and extending between said side plate portions, and being located to the rear of said spindle beneath said arm means to engage the latter to limit turning movement of said guide means and said belt means when said support means is moved upwardly away from said operating position thereof.

14. In a double belt drawing mechanism for textile machines, in combination, base means; support means turnably mounted on said base means for movement downwardly toward and upwardly away from an operating position where said support means is located over said base means, said support means including a pivot pin parallel to the drawing plane, elongated arm means extending forwardly from said pivot pin and being turnably connected thereto, and a spring connected to said arm means for urging the same downwardly toward the drawing plane; top roll means turnably carried for rotation about its axis by said support means for movement therewith to and from an operating position, said top roll means including a pair of hollow top rolls respectively located along said rotation axis on opposite sides of said arm means and each having an open inner end facing said arm means, a pair of shafts respectively located along said rotation axis within and turnably supporting said hollow top rolls and respectively having free end portions extending beyond said inner ends of said top rolls, a pair of tubular members fixedly connected to said free end portions of said shafts, respectively, and a spindle extending between and being turnably connected to said tubular members and having an axis parallel to and spaced from said rotation axis, said spindle being connected to said arm means to be carried thereby; endless belt means located about said top roll means and extending forwardly from the same in a direction substantially parallel to the drawing plane; guide means engaging said belt means to guide the same for movement, said guide means including a front plate portion having a front edge substantially parallel to the drawing plane and engaging said belt means, a pair of parallel spaced side plate portions extending rearwardly from said front plate portion, being pivotally connected thereto for turning movement with respect to the same about an axis parallel to the drawing plane, being respectively fixed to said tubular members, and extending to the rear of said spindle, and limiting means in the form of a rod parallel to the drawing plane, fixed to and extending between said side plate portions, and being located to the rear of said spindle beneath said arm means to engage the latter to limit turning movement of said guide means and said belt means when said support means is moved upwardly away from said operating position thereof; and lateral belt directing means removably mounted on said front plate portion of said guide means.

15. In a double belt drawing mechanism for textile machines, in combination, base means; support means turnably mounted on said base means for movement downwardly toward and upwardly away from an operating position where said support means is located over said base means, said support means including a pivot pin parallel to the drawing plane, elongated arm means extending forwardly from said pivot pin and being turnably connected thereto, and a first spring connected to said arm means for urging the same downwardly toward the drawing plane; top roll means turnably carried for rotation about its axis by said support means for movement therewith to and from said operating position, said top roll means including a pair of top rolls respectively located on opposite sides of said arm means and a spindle located between and fixed to said top rolls coaxially therewith and being connected to said arm means to be carried thereby; endless belt means located about said top roll means and extending forwardly from the same in a direction substantially parallel to the drawing plane; and guide means engaging said belt means to guide the same for movement, said guide means including a front plate having a front edge substantially parallel to the drawing plane and engaging said belt means, a plurality of parallel, spaced side plates extending rearwardly from said front plate being formed with notches in which said front plate is located, being located in planes normal to the drawing plane, and each having a substantially U-shaped recess extending upwardly from a bottom edge thereof and in which said spindle of said top roll means is located, said side plates extending to the rear of said spindle, connecting means interconnecting said side plates to fix the same to each other and being at least partly formed by a limiting means in the form of a member parallel to the drawing plane and located to the rear of said spindle beneath said arm means to engage the latter to limit turning movement of said guide means and said belt means when said support means is moved upwardly away from said operating position thereof.

16. In a double belt drawing mechanism for textile machines, in combination, base means; support means turnably mounted on said base means for movement downwardly toward and upwardly away from an operating position where said support means is located over said base means, said support means including a pivot pin parallel to the drawing plane, elongated arm means extending forwardly from said pivot pin and being turnably connected thereto, and a first spring connected to said arm means for urging the same downwardly toward the drawing plane; top roll means turnably carried for rotation about its axis by said support means for movement therewith to and from said operating position, said top roll means including a pair of top rolls respectively located on opposite sides of said arm means and a spindle located between and fixed to said top rolls coaxially therewith and being connected to said arm means to be carried thereby; endless belt means located about said top roll means and extending forwardly from the same in a direction substantially parallel to the drawing plane; and guide means engaging said belt means to guide the same for movement, said guide means including a front plate having a front edge substantially parallel to the drawing plane and engaging said belt means, a plurality of parallel, spaced side plates extending rearwardly from said front plate, being formed with notches in which said front plate is slidably located, being located in planes normal to the drawing plane, and each having a substantially U-shaped recess extending upwardly from a bottom edge thereof and in which said spindle of said top roll means is located, said side plates extending to the rear of said spindle, connecting means interconnecting said side plates to fix the same to each other and being at least partly formed by a limiting means in the form of a member parallel to the drawing plane and located to the rear of said spindle beneath said arm means to engage the latter to limit turning movement of said guide means and said belt means when said support means is moved upwardly away from said operating position thereof, and resilient means engaging said front plate and urging the same outwardly of said notches, said resilient means being mounted on said side plates.

17. In a double belt drawing mechanism for textile machines, in combination, base means; support means turnably mounted on said base means for movement downwardly toward and upwardly away from an operating position where said support means is located over said base means, said support means including a pivot pin parallel to the drawing plane, elongated arm means extending forwardly from said pivot pin and being turnably connected thereto, and a first spring connected to said arm means for urging the same downwardly toward the drawing plane; top roll means turnably carried for rotation about its axis by said support means for movement therewith to and from said operating position, said top roll means including a pair of top rolls respectively located on opposite sides of said arm means and a spindle located between and fixed to said top rolls coaxially therewith and being connected to said arm means to be carried thereby; endless belt means located about said top roll means and extending forwardly from the same in a direction substantially parallel to the drawing plane; and guide means engaging said belt means to guide the same for movement, said guide means including a plate having a front edge portion engaging said belt means to guide the same and having a rear end portion resting on said spindle of said top roll means, and a leaf spring connected to said plate adjacent said front edge portion thereof, extending rearwardly beneath said arm means, and engaging a forward part of the latter so as to urge said plate forwardly and downwardly toward the drawing plane.

18. In a double belt drawing mechanism for textile machines, in combination, base means; support means turnably mounted on said base means for movement downwardly toward and upwardly away from an operating position where said support means is located over said base means, said support means including a pivot pin parallel to the drawing plane, elongated arm means extending forwardly from said pivot pin and being turnably connected thereto, and a first spring connected to said arm means for urging the same downwardly toward the drawing plane; top roll means turnably carried for rotation about its axis by said support means for movement therewith to and from said operating position, said top roll means including a pair of top rolls respectively located on opposite sides of said arm means and a spindle located between and fixed to said top rolls coaxially therewith and being connected to said arm means to be carried thereby; endless belt means located about said top roll means and extending forwardly from the same in a direction substantially parallel to the drawing plane; and guide means engaging said belt means to guide the same for movement, said guide means including a plate having a front edge portion engaging said belt means to guide the same and having a rear end portion resting on said spindle of said top roll means, and said plate having projections extending forwardly and downwardly from said front edge portion thereof to laterally guide said belt means and to engage a part of said base means for limiting downward movement of said front edge portion of said plate, and a leaf spring connected to said plate adjacent said front edge portion thereof, extending rearwardly beneath said arm means, and engaging a forward part of the latter so as to urge said plate forwardly and downwardly toward the drawing plane.

19. In a double belt drawing mechanism for textile machines, in combination, base means; support means turnably mounted on said base means for movement downwardly toward and upwardly away from an operating position where said support means is located over said base means, said support means including a pivot pin parallel to the drawing plane, elongated arm means extending forwardly from said pivot pin and being turnably connected thereto, and a first spring connected to said arm means for urging the same downwardly toward the drawing plane; top roll means turnably carried for rotation about its axis by said support means for movement therewith to and from said operating position, said top roll means including a pair of top rolls respectively located on opposite sides of said arm means and a spindle located between and fixed to said top rolls coaxially therewith and being connected to said arm means to be carried thereby; endless belt means located about said top roll means and extending forwardly from the same in a direction substantially parallel to the drawing plane; and guide means engaging said belt means to guide the same for movement, said guide means including a plate having a front edge portion engaging said belt means to guide the same and having a rear end portion resting on said spindle of said top roll means, and a leaf spring connected to said plate adjacent said front edge portion thereof, extending rearwardly beneath said arm means, and engaging a forward part of the latter so as to urge said plate forwardly and downwardly toward the drawing plane, said leaf spring having a free rear end portion adapted to engage part of said arm means to limit turning movement of said guide means about said spindle upon movement of said support means upwardly away from said operating position thereof.

20. In a double belt drawing mechanism for textile machines, in combination, base means; support means turnably mounted on said base means for movement downwardly toward and upwardly away from an operating position where said support means is located over said base means; top roll means carried by said support means for movement therewith to and from said operating position; endless belt means located about said top roll means and extending forwardly from the same in a direction substantially parallel to the drawing plane; guide means engaging said belt means to guide the same for movement and being mounted on a part of said top roll means for free turning movement about the same so that a portion of said guide means moves freely along a predetermined path when said support means is moved upwardly away from said operating position thereof; and a stop portion forming part of said support means and being located in said path to engage said portion of said guide means for limiting movement of the latter and said belt means with respect to said support means when the latter is raised upwardly away from said operating position thereof.

21. In a double belt drawing mechanism for textile machines, in combination, base means; support means turnably mounted on said base means for movement downwardly toward and upwardly away from an operating position where said support means is located over said base means, said support means including a pivot pin parallel to the drawing plane, elongated arm means extending forwardly from said pivot pin and being turnably connected thereto, and a spring connected to said arm means for urging the same downwardly toward the drawing plane; top roll means carried for rotation about its axis by said support means for movement therewith to and from said operating position, said top roll means including a pair of top rolls respectively located on opposite sides of said arm means and a spindle located between and fixed to said top rolls coaxially therewith and being connected to said arm means to be carried thereby; endless belt means located about said top roll means and extending forwardly from the same in a direction substantially parallel to the drawing plane; and guide means engaging said belt means to guide the same for movement, said guide means having a front edge substantially parallel to the drawing plane and engaging said belt means and having a limiting means which engages part of said support means when the latter is raised upwardly away from said operating position thereof to limit movement of said guide means and belt means with respect to said support means.

No references cited.